US012186781B1

(12) United States Patent
Serstad et al.

(10) Patent No.: US 12,186,781 B1
(45) Date of Patent: Jan. 7, 2025

(54) OPTIMIZATION OF SORTATION ORDER RECEPTACLE FILLING

(71) Applicant: Tompkins Robotics, Inc., Orlando, FL (US)

(72) Inventors: James M. Serstad, Orlando, FL (US); Michael C. Futch, Cocoa, FL (US); Adam P. Claybrook, Red Bank, NJ (US); Parthiban A. Mathavan, Cary, NC (US)

(73) Assignee: Tompkins Robotics, Inc., Orlando, FL (US)

( * ) Notice: Subject to any disclaimer, the term of this patent is extended or adjusted under 35 U.S.C. 154(b) by 0 days.

(21) Appl. No.: 18/470,670

(22) Filed: Sep. 20, 2023

(51) Int. Cl.
*B07C 5/36* (2006.01)
*B07C 5/34* (2006.01)

(52) U.S. Cl.
CPC ............ *B07C 5/362* (2013.01); *B07C 5/3412* (2013.01); *B07C 2501/0063* (2013.01)

(58) Field of Classification Search
CPC ......... B07C 5/3412; B07C 5/362; B07C 5/36; B07C 5/38
USPC .......................................................... 209/552
See application file for complete search history.

(56) References Cited

U.S. PATENT DOCUMENTS 5,829,349 A * 11/1998 Fitzgerald ............. B30B 9/3007 312/211
7,119,689 B2 * 10/2006 Mallett ................... B07C 7/005 705/308
10,016,789 B2 * 7/2018 Eger ....................... B65H 31/24
11,020,770 B1 * 6/2021 Tilekar .................... B07C 3/087
11,564,766 B2 * 1/2023 Savage ................. B30B 9/3003
2007/0056885 A1 * 3/2007 Enenkel .................. B07C 3/008 209/584

FOREIGN PATENT DOCUMENTS

WO WO-2009114582 A2 * 9/2009 ............. B30B 9/323

* cited by examiner

*Primary Examiner* — Michael McCullough
*Assistant Examiner* — Molly K Devine
(74) *Attorney, Agent, or Firm* — Parthiban A Mathavan

(57) ABSTRACT

Chamber bank for use in a sorting operation includes chambers for receiving a receptacle therein. Each chamber is defined by a floor, a left wall, a right wall, and a rear wall that together define a receiving space for a receptacle. At least one of the left and right wall is taller than the corresponding abutting side wall of the receptacle received therein. A system assigns a first number of articles occupying a first volume to the receptacle such that the first number of articles overfills the receptacle when all of the first number of articles are deposited thereinto.

20 Claims, 13 Drawing Sheets

OPTIMIZATION OF SORTATION ORDER RECEPTACLE FILLING

TECHNICAL FIELD

This invention relates generally to the field of warehouse automation, and particularly to systems and methods for automated sortation of articles into receptacles.

BACKGROUND

An article sorting system at a distribution center or warehouse operates to sort articles to destinations, each destination typically represented by a receptacle. The receptacle may be a bin, cardboard box, bag, tote, or any other generic container. As an empty receptacle gets filled with articles being sorted thereinto, for e.g., by such articles being dropped or deposited into the receptacle by an automated device, one or more of the sorted articles deposited into the receptacle may protrude or overhang above the rim of the receptacle even when the receptacle may not actually be full in terms of its cubic capacity and may otherwise still have space available for accepting one or more additional articles. Nonetheless, due to an article present within the receptacle overhanging above the rim of the receptacle, a system or an operator may conclude that the receptacle is ready to be sealed or otherwise needs to be transferred to its next processing location. This results in wasted space and inefficiencies resulting therefrom.

Accordingly, opportunities exist for improving the efficiencies associated with an article sorting system by optimizing the receptacle filling process.

SUMMARY OF INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

According to one or more embodiments, a system for use in directing a sorting operation is provided. According to at least one embodiment, the system may have a server comprising a memory, a processor, and a receptacle assignment engine. The system further may have a chamber bank comprising at least one chamber configured for receiving a receptacle therein. The chamber is defined by a floor, a left wall, a right wall, and a rear wall that together define a receiving space for a receptacle, wherein at least one of the left and right wall extends above a top rim of the receptacle received therein. The system may also have an automated transport device for transporting and depositing articles into the receptacles. The system may be configured to: assign a first number of articles occupying a first volume to a first receptacle such that the first number of articles overfills the first receptacle when all of the first number of articles are deposited thereinto; and direct an automated transport device to transport and deposit the first count of articles into the first receptacle.

According to one or more embodiments, a chamber bank for use in directing a sorting operation is provided. According to at least one embodiment, the chamber bank may have at least one chamber for receiving a receptacle therein. The chamber may be defined by a floor, a left wall, a right wall, and a rear wall that together define a receiving space for a receptacle. At least one of the left and right wall is taller than the corresponding abutting side wall of the receptacle received therein. A first number of articles occupying a first volume are assigned for deposition into the receptacle such that the first number of articles overfills the receptacle when all of the first number of articles are deposited thereinto.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems, and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION OF THE EMBODIMENTS

Figure 1:
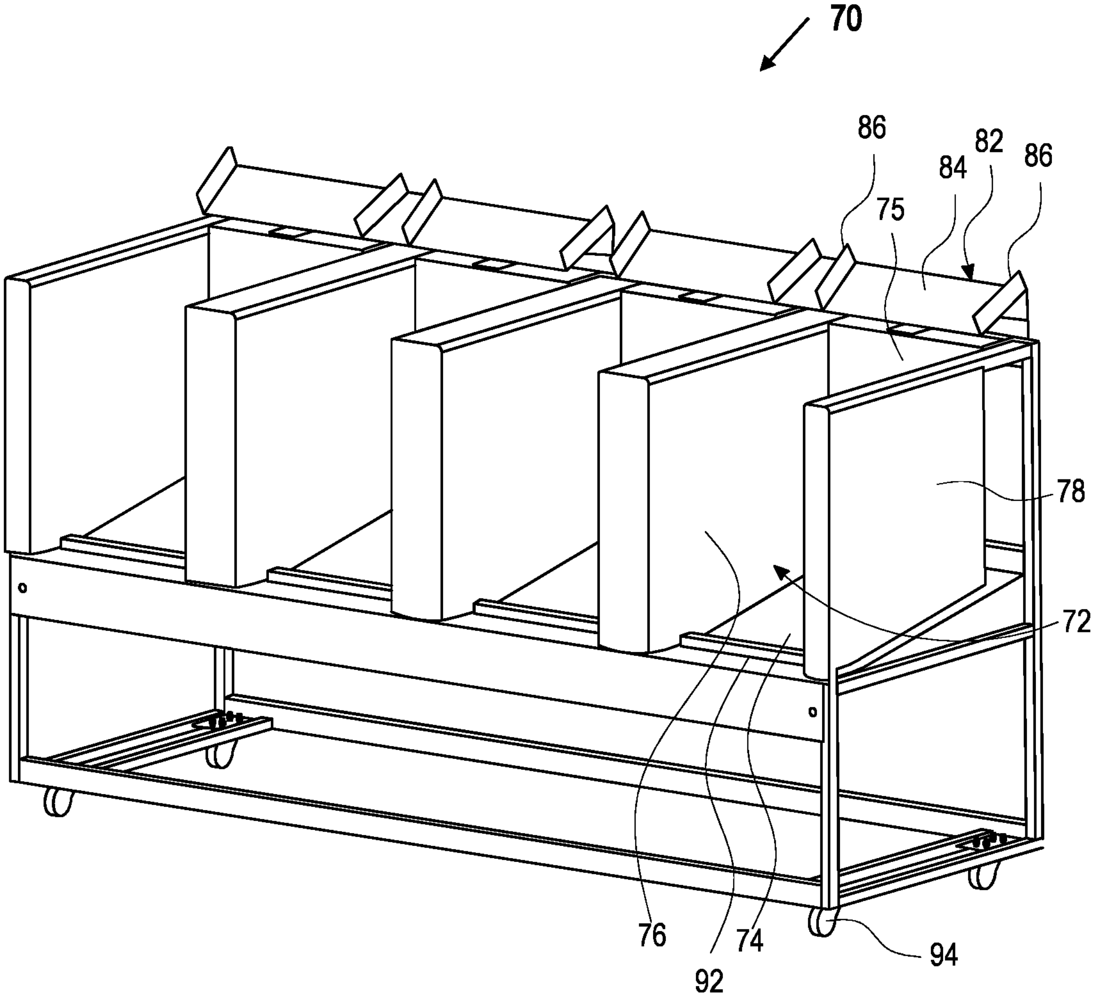
FIG. 1 depicts an example implementation of a chamber bank for use in directing a sorting operation, according to one or more implementations of the presently disclosed subject matter.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings.

As noted earlier, in an article sorting system, when a receptacle is determined to be full by a human operator or by a control system, the receptacle needs to be removed and replaced with an empty receptacle. As an empty receptacle gets filled by articles being sorted thereinto, for e.g., by way of such articles being dropped or deposited into the receptacle by an automated device, one or more of the sorted articles deposited into the receptacle may protrude or overhang above the rim of the receptacle even when the receptacle may not be full in terms of its cubic capacity and may otherwise still have space available for accepting one or more additional articles. Nonetheless, due to an article present within the receptacle extending/protruding above the rim of the receptacle, a system or an operator may conclude that the receptacle is ready to be sealed or is otherwise ready for being transferred to its next location for shipping. This may happen in spite of the receptacle still having some space available to accept one or more additional articles. Embodiments disclosed herein may overcome such limitations by providing for filling up the receptacles more fully without leaving too much in terms of wasted space within the receptacles as the receptacles get filled out with sorted articles.

Embodiments of the presently disclosed subject matter accordingly advantageously overcome the limitations of the art by providing for apparatus, systems and methods to sort articles to destination receptacles in a manner that overcomes inherent inefficiencies and inflexibilities present in the current state of the art. Embodiments of the presently disclosed subject matter can thus help maximize the filling efficiencies of bins, totes, boxes and other collection containers during the sortation of articles thereinto. Various embodiments disclosed herein provide for apparatus, systems, and methods for overfilling a destination receptacle as and when needed to thereby improve overall operational efficiencies, according to one or more implementations of the presently disclosed subject matter.

Sortation systems used at distribution centers typically require a large number of collection receptacles along with their associated large physical space, large capital costs, and large operating costs. For example, businesses such as pharmacies that distribute medication, for e.g., script packages, need to sort them by store, customer, or shipping service provider before each script package (alternately referred to herein as "script") is sent to the proper recipient. This procedure is also applicable to businesses that need to sort all other articles such as generic packages, health items, beauty items, and similar other items. Once the script packages are sorted by destination such as, for e.g., store, end customer or end shipping service, these articles are sorted into receptacles for safe shipment to the end destination. Sorted articles may be sorted to totes, mail bags, cardboard boxes, and other kinds of receptacles.

A script provider benefits from maximizing the number of script packages that fit into a receptacle. This is because a script provider is typically charged a certain $ amount per receptacle, e.g., $10 per tote to be shipped. Alternately, the script provider may itself own the transportation means (e.g., tractor trailers) whereby the script provider encumbers direct costs for fuel and labor associated with a sealed script receptacle being shipped including the costs associated with any unused or wasted space remaining within the receptacle. Accordingly, it is beneficial to maximize the packing density of each receptacle to thereby minimize overall transportation costs for the script packages. Increasing the script packages filled into each tote accordingly reduces the overall transportation and handling costs associated with sorting and delivering the script packages to their final destinations.

Several experiments were conducted to maximize the utilization of the receptacle space. During the experiments, it was observed that each receptacle or tote (the terms "receptacle" and "tote" may be used interchangeably) accepted 7.8 script packages thereinto on average before it needed to be "groomed," wherein a manual operator physically needed to press down and compress ("groom") the script packages already present in a receptacle to thereby remove air from and between the script bags before further script packages could be deposited into the same tote until it is considered full with maximum space utility or close to it achieved. Through repeated and periodic grooming, the tote could be made to ultimately hold between 25 and 30 script packages before it could receive no more script packages and therefore had to be removed and replaced with an empty tote. It was found that 5 to 6 "grooming" visits by a manual operator were required for each tote to reach the 25-30 script packages count. Each groom equates to labor, which increases costs to the script provider.

Experiments were conducted to find ways for maximizing the number of script packages held per tote while reducing the overall cost of the sortation process. Various tweaks to the equipment were made by including or removing one or more of the transitions (e.g., in the form of ramps) and the casters/wheels. In one embodiment, script packages were diverted to or deposited into a tote until the tote was deemed full by a sensor, e.g., in the form of a photo-eye sensor, and the corresponding script count was recorded. The packages were then "groomed" or packed down to determine the quantity of additional scripts that could diverted into the same tote until the tote was deemed full by the photo-eye sensor again. Grooming was repeated and a 3rd count of scripts diverted, and this $3^{rd}$ count was recorded. This process was repeated several times for each configuration and each configuration included at least 25 cycles. Table 1 below provides summarized results of testing and it indicates quantity of scripts diverted before a photo-eye sensor notification is triggered:

TABLE 1

| Configuration | Transition | Casters | Average # of scripts 1st Full | 2nd Full | 3rd Full | Total | Errors |
|---|---|---|---|---|---|---|---|
| 1 (baseline) | Included | Included | 7.8 | 4.0 | 2.2 | 14.0 | 0.0% |
| 2 | None | Included | 6.6 | 3.4 | 3.0 | 13.0 | 0.0% |
| 3 | Included | None | 8.8 | 5.4 | 3.8 | 18.0 | 0.0% |
| 4 | None | None | 10.0 | 4.4 | 4.0 | 18.4 | 1.1% |
| 5 | None (PE) | None | 9.8 | 5.8 | 3.8 | 19.4 | 0.0% |

Configuration 1 shown in Table 1 included casters on the chamber banks (alternately referred to as "carts") as well as ramps provided between the platforms or tables and the totes; it was treated as a baseline. The ramps provided a transition for guiding script packages away from the photo-eye sensor. In Configuration 1, about 14.0 scripts were diverted into a tote on average before the first photo-eye sensor notification indicating "tote full" was triggered. Configuration 2 did not include the ramp but included casters. Configuration 2 with a total of 13.0 scripts on average was found to underperform as compared to Configuration 1. Configuration 3 included the ramp but excluded the casters. Configuration 3 showed a 29% increase in total diverts over Configuration 1. This showed that increasing the distance between the tote and the photo-eye sensor resulted in improving the quantity of scripts that could be deposited in the tote before the tote becomes full.

Configuration 4 excluded both the ramp and the casters. Configuration 4 showed a small improvement over Configuration 3; It was observed that one package did not divert successfully into the tote but instead fell to the side of the tote. For Configuration 5, the photo-eye sensor was rotated between 15 and 180 degrees or higher to allow the photo-eye sensor, for e.g., to beam towards a horizontal line a one or more inches above the top rim of the tote. Configuration 5 otherwise excluded both the ramp and the casters. Configuration 5 resulted in a 1.4 script packages improvement over Configuration 3; however, configuration 5 also exhibited a few instances where script packages risked falling out of the tote, for e.g., they were half-in and half-out of the tote. This implied a high risk of tote packages falling outside of the tote when a tote is being overfilled with the ramp is absent; this also implied a high risk of an automated transport vehicle (traveling on a platform for depositing such scripts packages into the tote) dragging one such "half-in half out" script package as the vehicle drives by.

During a second set of experiments, controlled tests were conducted to determine an optimal spacing between the photo-eye sensor and the top rim of a tote. A sample of script packages was created by including 30 cc vials, 90 cc vials and candy boxes packaged into 11"×14" polybags to create a total of 100 script packages. The breakdown of polybags is shown in the table 2 below:

TABLE 2

| Script count out of 100 | Total Items in Script | Contents | Sheet paper count |
|---|---|---|---|
| 70 | 1 | 30 cc vials | 3-4 |
| 10 | 2 | 30/90 cc vials, boxes | 5 |
| 10 | 2 | 30/90 cc vials, boxes | 5 |
| 5 | 3 | 30/90 cc vials, boxes | 7 |
| 5 | 4 | 30/90 cc vials, boxes | 10 |

A mock chamber bank (e.g., a tote cart) for supporting receptacles such as totes was created with the spacing between a top rim of the tote and the photo-eye sensor set at different measurements including spacings of 6", 8" and 10" apart to allow testing of performance under these 3 configurations. The script packages were inducted randomly to represent a real-life sorting operation, with these script packages deposited into a tote until the tote was deemed full by the photo-eye sensor. The results of the script packages count are shown in Table 3 below:

TABLE 3

| Spacing between photo-eye sensor and top rim of tote | Packages to full |
|---|---|
| 6" | 28.3 |
| 8" | 36 |
| 10" | 46.6 |

At 10" (ten inch) spacing, several script packages were found to fall to the ground, which could increase labor costs and decrease efficiency. At 8" spacing, it was observed that the efficiency was optimized as no script packages fell to the ground even though the number of packages to full was reduced as compared to the 10" setting. Accordingly, the optimal spacing between the photo-eye sensor and the top of the tote was determined to be 8 inches.

In a subsequent set of experiments, the angle of the transition or ramp was set at various angles with a view to further improving efficiencies. Two configurations of the ramp were finalized and testing at 28 degrees and at 35 degrees were conducted. The experiments indicated that keeping the angle of the chute at 35 degrees is preferable due to the increase in the number of script packages per tote plus the fact that no scripts fell on the ground during sortation. The results are summarized below in Table 4.

TABLE 4

| Angle of Transition | # of Runs | Scripts on the ground | Average scripts/tote |
|---|---|---|---|
| 35 | 20 | 0 | 26.5 |
| 28 | 40 | 6 | 24.7 |

The experiments showed that adjusting the spacing between the photo-eye sensor (that recognizes a predetermined percentage of overfill of 1% to 400% or higher for example) and the top rim of a receptacle can advantageously provide room for script packages to stack up above a top rim of a receptacle, thereby maximizing the amount of script packages that can fit into a receptacle while simultaneously minimizing the labor required to achieve this. For example, if 100,000,000 script packages are to be sorted annually, with the original design, this would require 7,142,857 receptacles at 14 script packages/receptacle. However, with the modified design where a receptacle can fit 26.5 script packages it would only require 3,773,585 receptacles. At $10/receptacle cost for shipping, this equates to $33.7 million in annual savings in transportation costs alone. The secondary benefit is that there is no need to "groom" the receptacle with the new design. For example, if a human operator needs to expend about 10 seconds per grooming event to groom a receptacle, the modified design can result in an additional $892,000 in annual labor savings at $15/hour of labor cost (tending to 7,142,857 totes annually at 10 seconds per groom, needing to groom 3 times to reach 14 scripts/tote). Table 5 and Table 6 below provide additional detailed results of testing, indicate quantity of scripts diverted until full photo-eye sensor triggered by Configuration by Test.

TABLE 5

| | 1st Test | | | | 2nd Test | | | | 3rd Test | | | |
|---|---|---|---|---|---|---|---|---|---|---|---|---|
| Config. | 1st Full | 2nd Full | 3rd Full | Error | 1st Full | 2nd Full | 3rd Full | Error | 1st Full | 2nd Full | 3rd Full | Error |
| 1 | 7 | 5 | 2 | 0 | 9 | 2 | 2 | 0 | 8 | 5 | 3 | 0 |
| 2 | 8 | 4 | 3 | 0 | 6 | 2 | 4 | 0 | 7 | 2 | 2 | 0 |
| 3 | 6 | 6 | 4 | 0 | 12 | 5 | 5 | 0 | 7 | 2 | 5 | 0 |
| 4 | 10 | 4 | 4 | 0 | 9 | 7 | 4 | 0 | 11 | 4 | 5 | 1 |
| 5 | 14 | 6 | 5 | 0 | 12 | 6 | 2 | 0 | 8 | 8 | 4 | 0 |

TABLE 6

| | 4th Test | | | | 5th Test | | | |
|---|---|---|---|---|---|---|---|---|
| Configuration | 1st Full | 2nd Full | 3rd Full | Errors | 1st Full | 2nd Full | 3rd Full | Errors |
| 1 | 6 | 5 | 2 | 0 | 9 | 3 | 2 | 0 |
| 2 | 6 | 5 | 3 | 0 | 6 | 4 | 3 | 0 |
| 3 | 8 | 9 | 3 | 0 | 11 | 5 | 2 | 0 |
| 4 | 11 | 2 | 3 | 0 | 9 | 5 | 4 | 0 |
| 5 | 6 | 5 | 3 | 0 | 9 | 4 | 5 | 0 |

Figure 2:
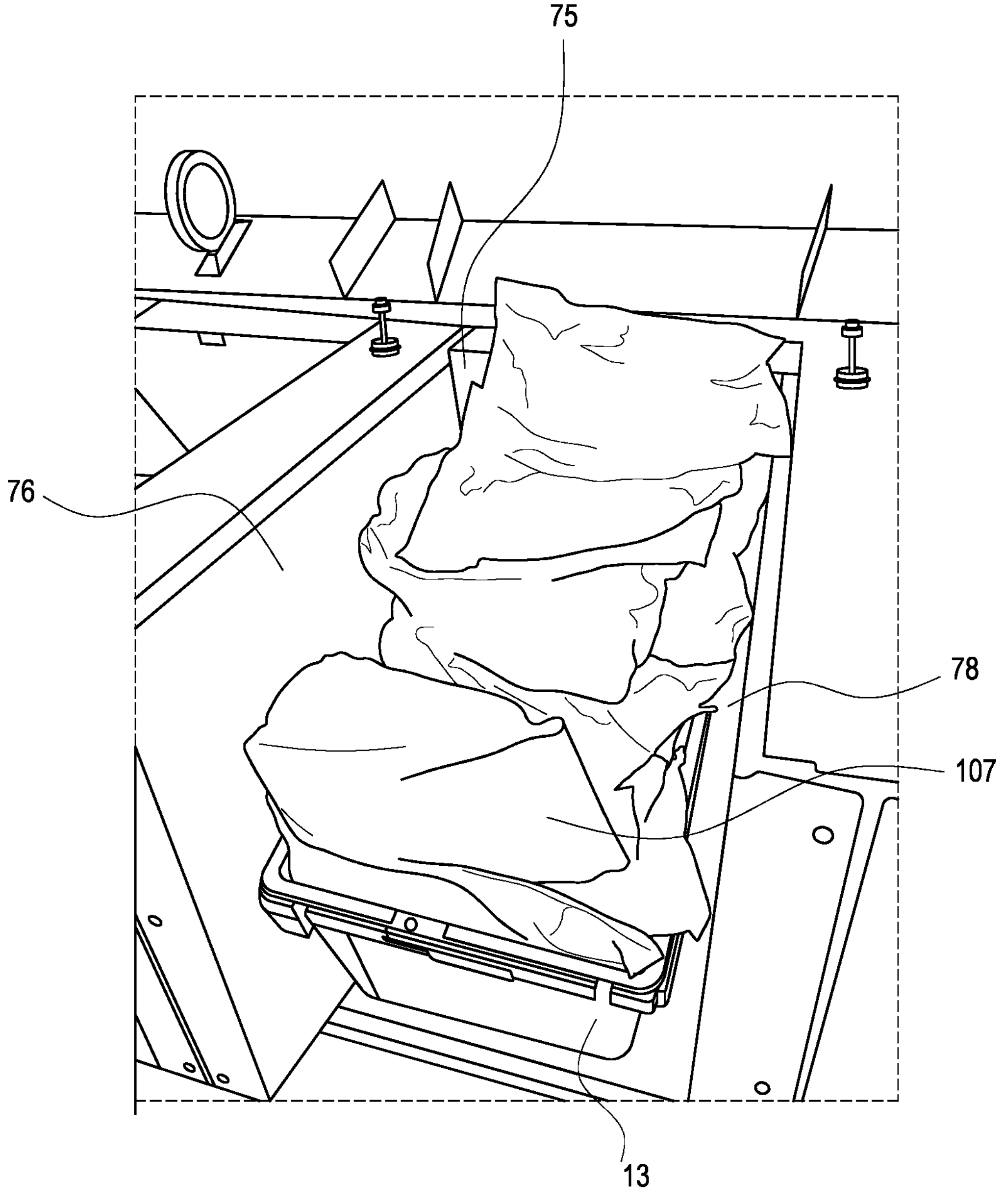
FIGS. 2-7 depict various aspects of a chamber bank for use in directing a sorting operation, according to one or more implementations of the presently disclosed subject matter.
Figure 3:
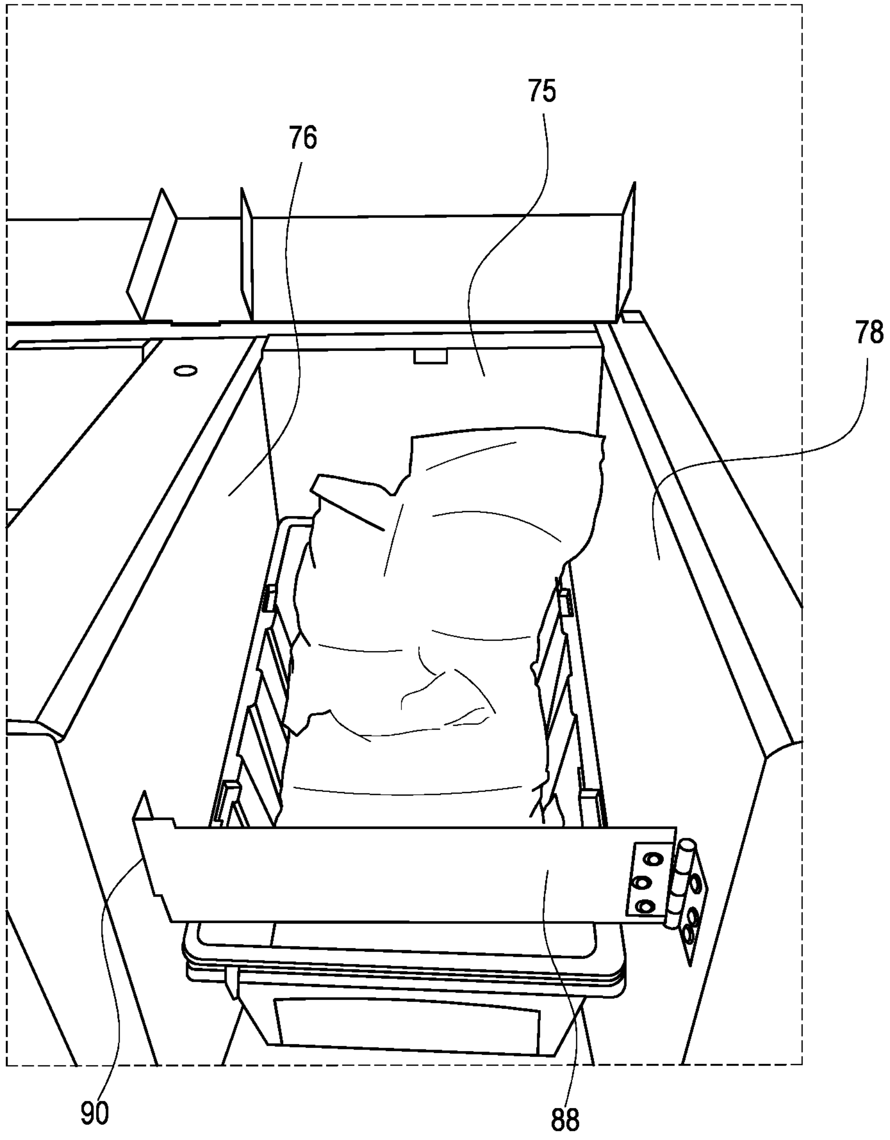
Figure 4:
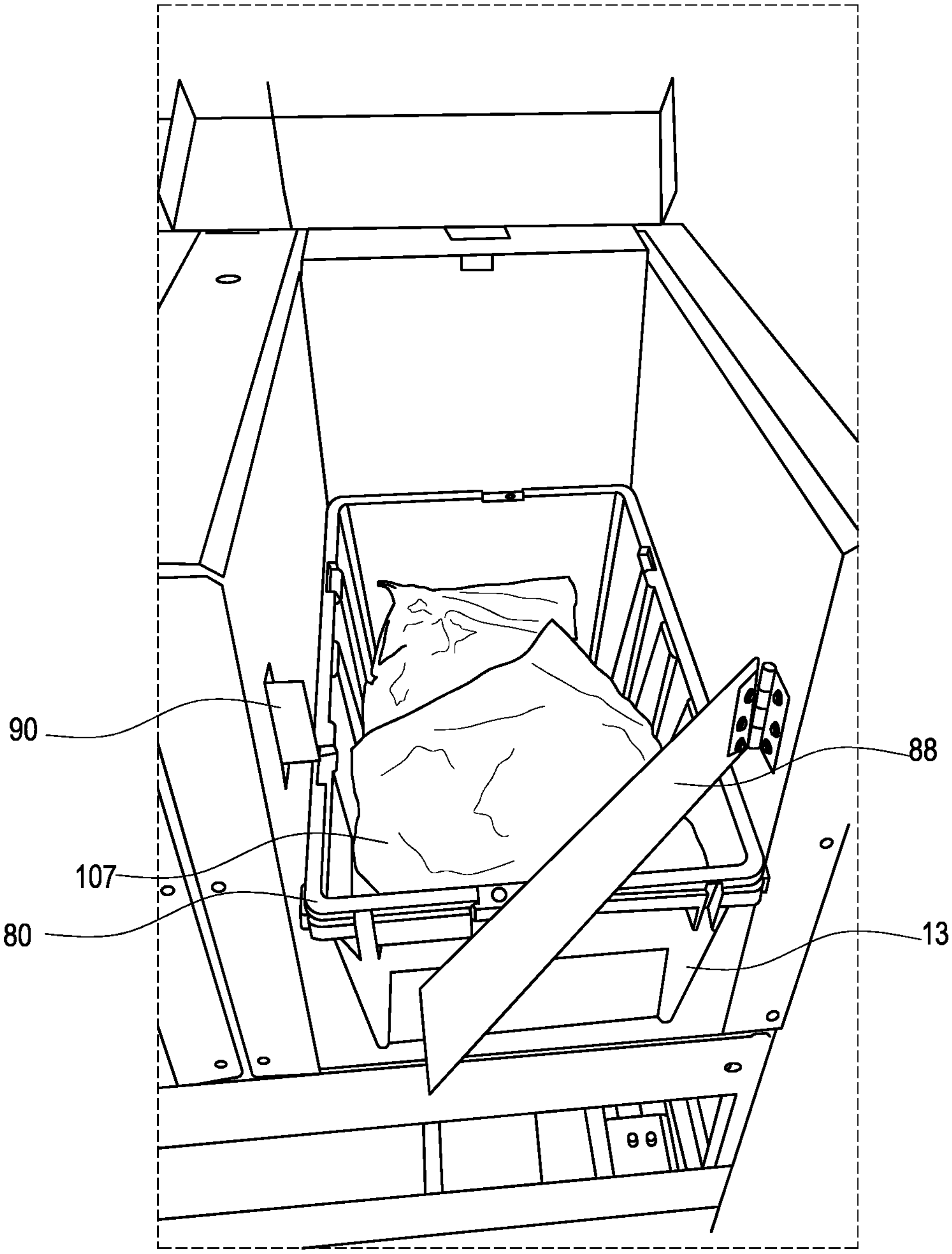
Figure 5:
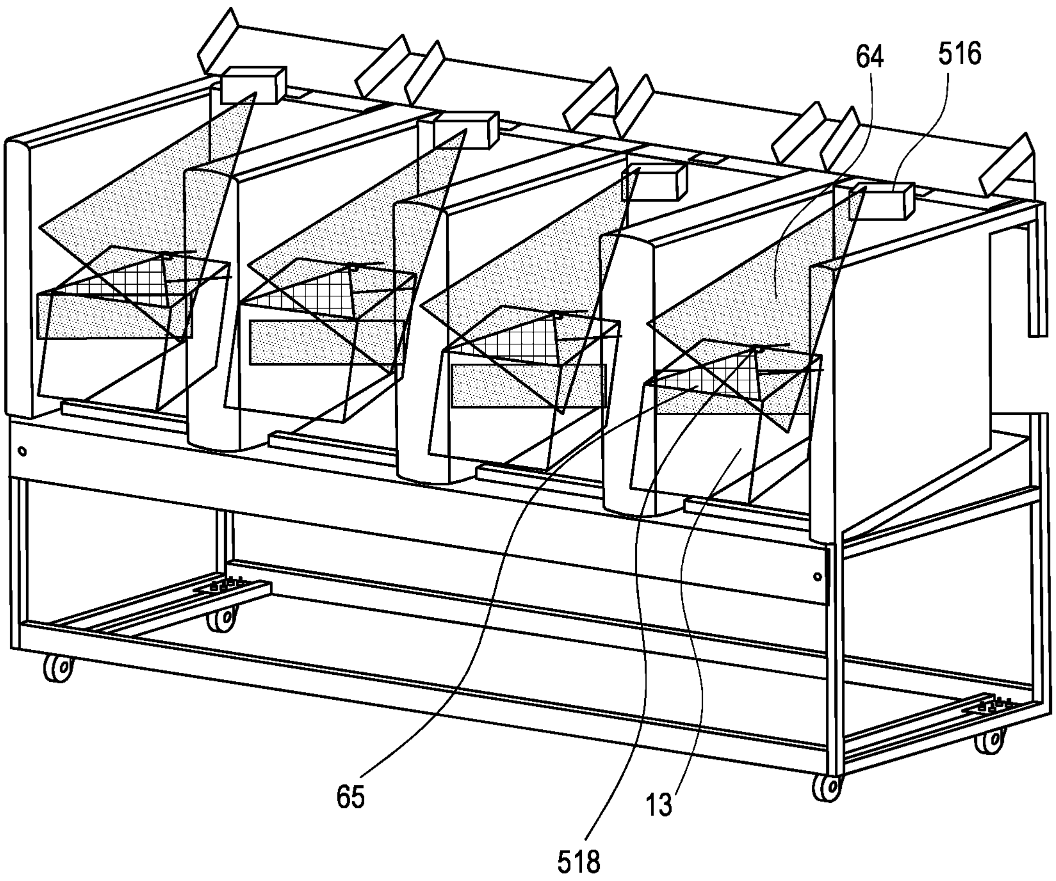
Figure 6:
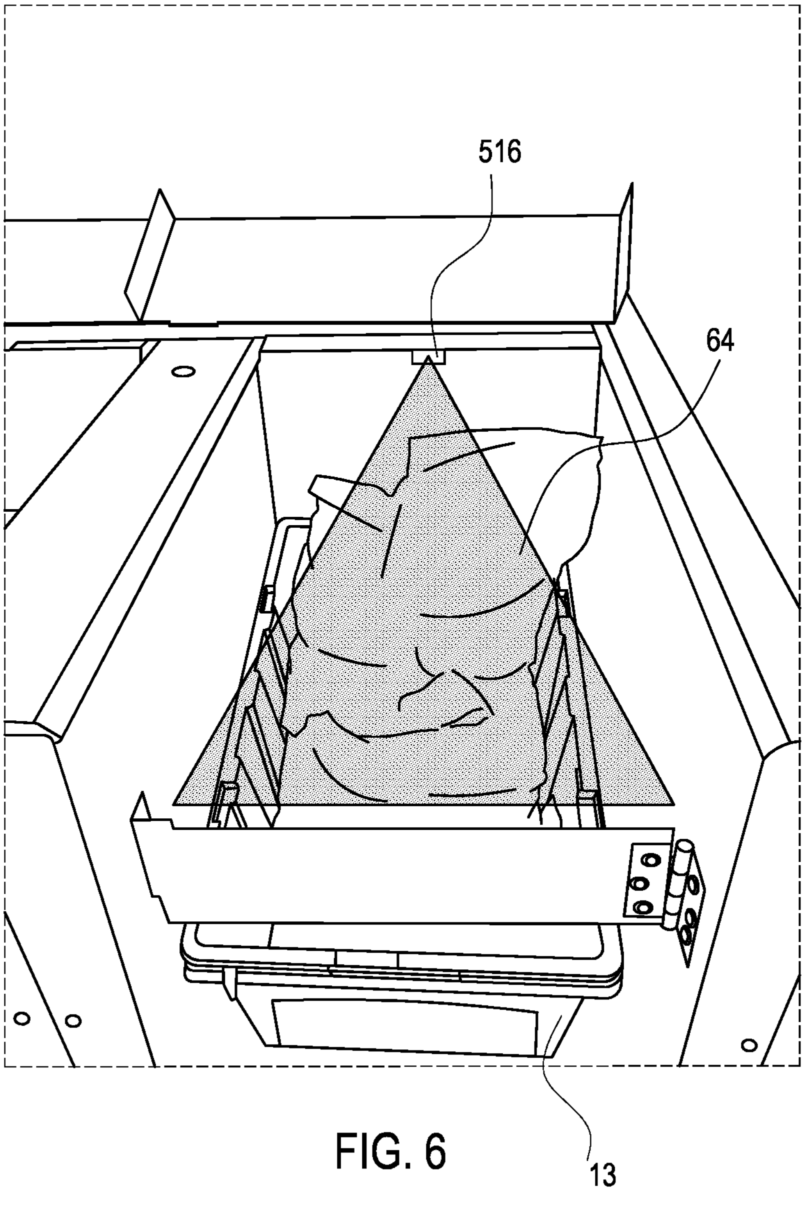
Figure 7:
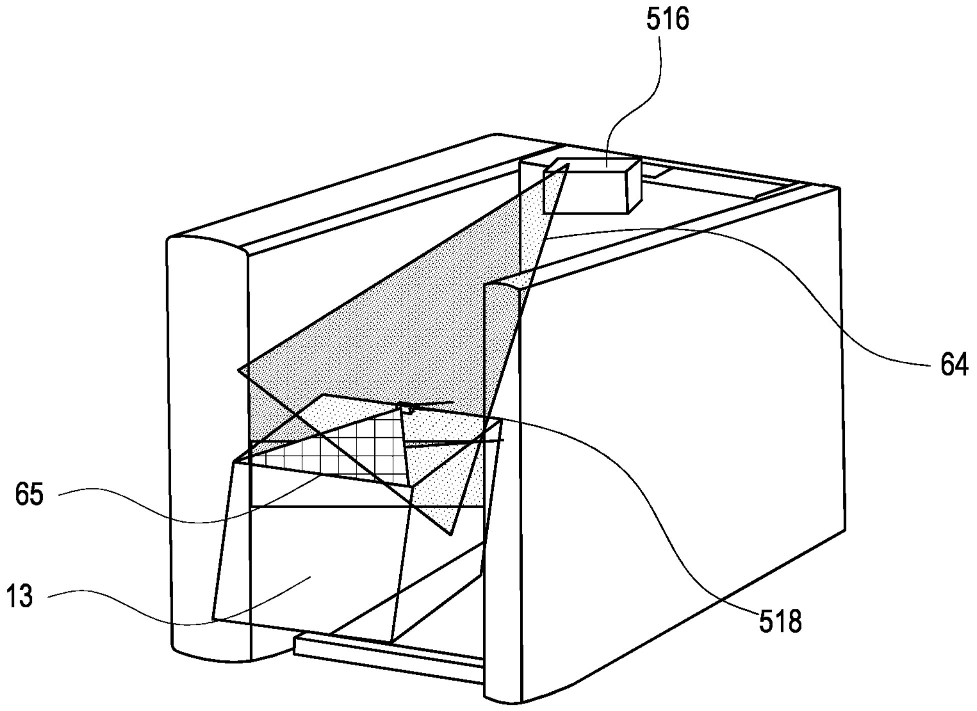
Figure 8:
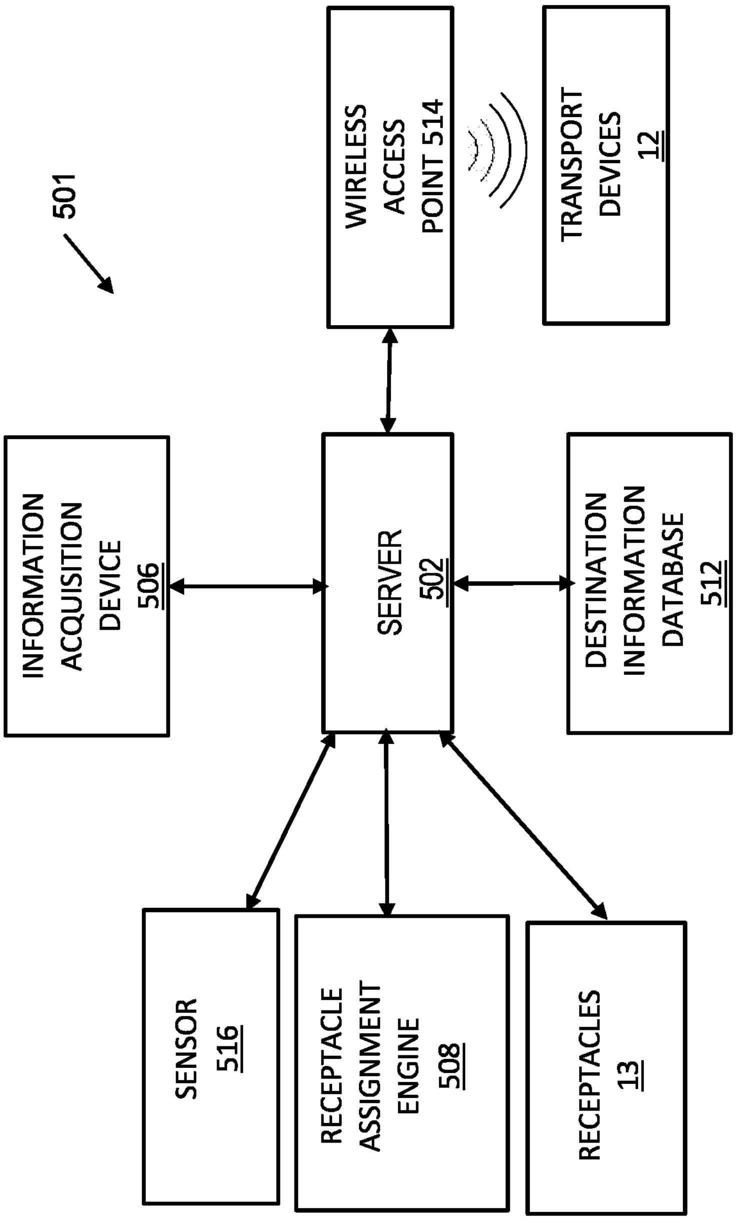
FIG. 8 depicts a block diagram of an exemplary sorting system for use in directing a sorting operation such that the filling of a destination receptacle is optimized, according to one or more implementations of the presently disclosed subject matter.
Figure 9:
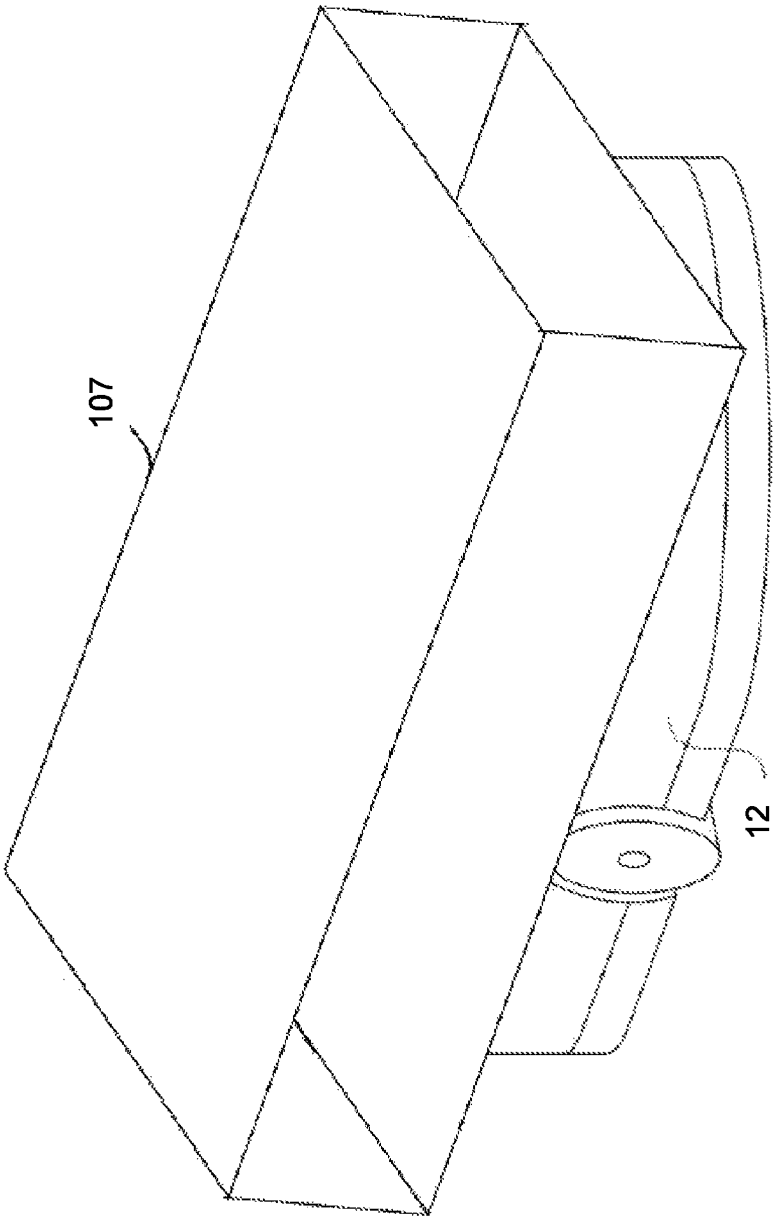
FIG. 9 depicts an example implementation of an automated transport device for transporting an article to be sorted to a destination receptacle, according to one or more implementations of the presently disclosed subject matter.
Figure 10:
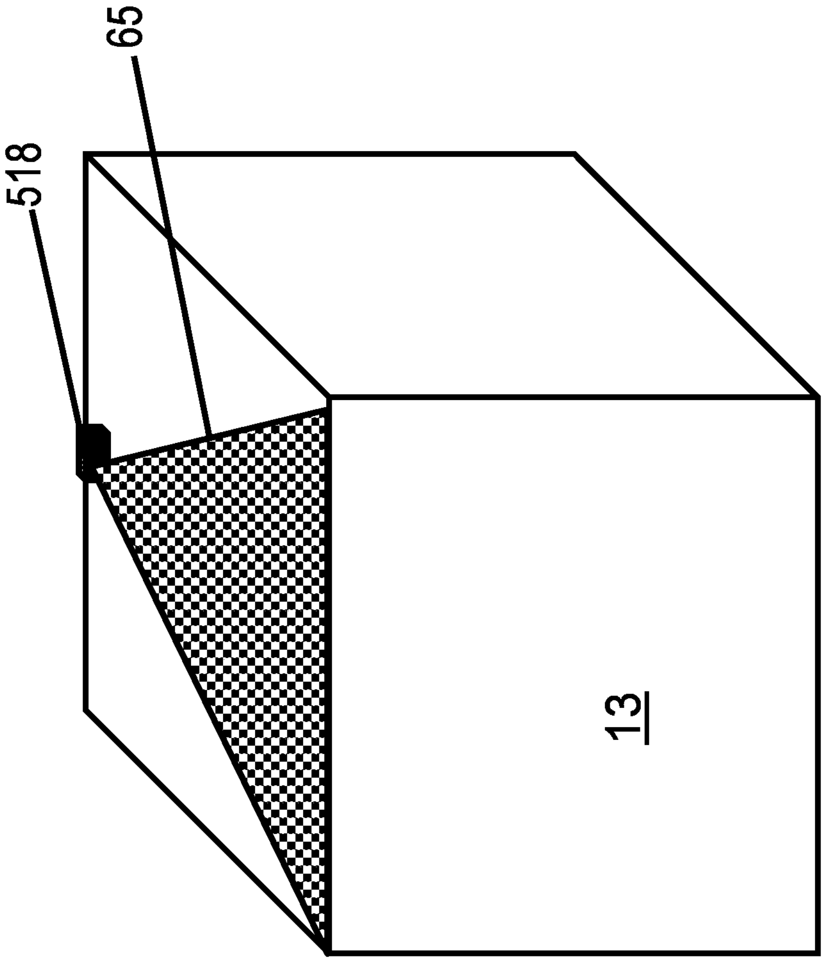
FIG. 10 depicts an example implementation of a sensor such as, for e.g., an optical sensor or a photo-eye sensor, that senses that a destination receptacle has become full or is about to become full, according to one or more implementations of the presently disclosed subject matter.
Figure 11:
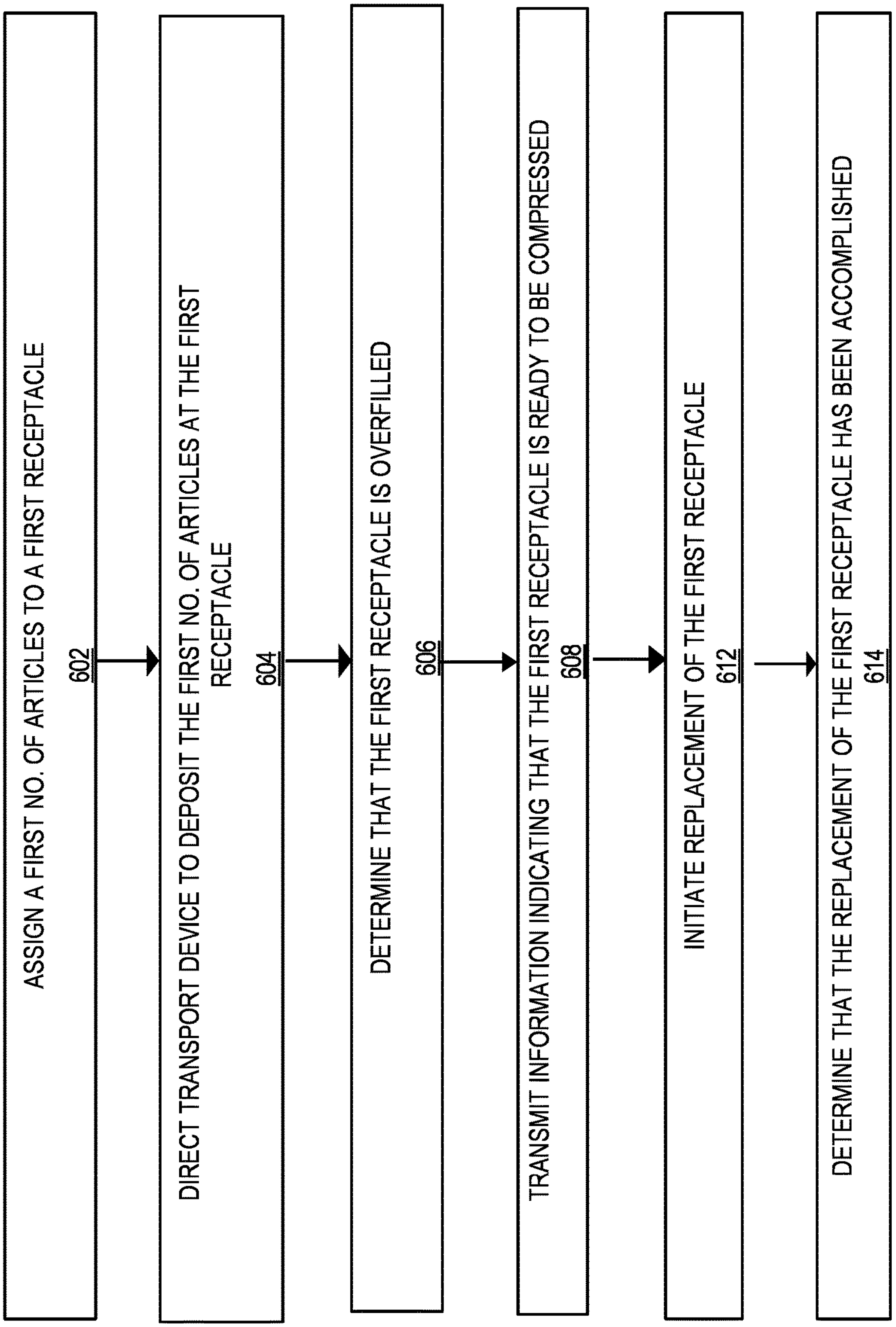
FIG. 11 depicts an exemplary flowchart of an exemplary implementation of an improved sorting system for use in directing a sorting operation, according to one or more implementations of the presently disclosed subject matter.
Figure 12:
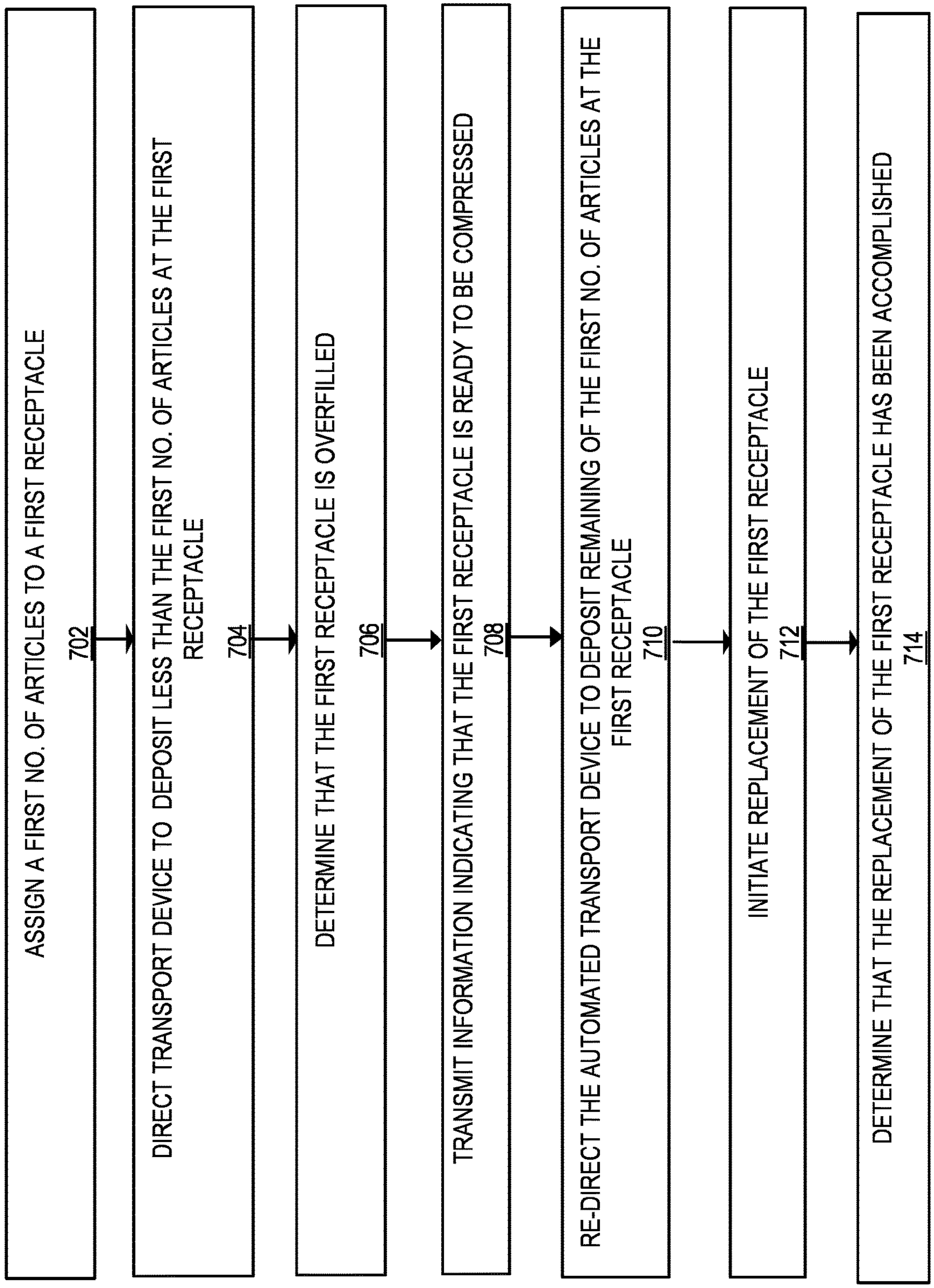
FIG. 12 depicts an exemplary flowchart of an exemplary implementation of an improved sorting system for use in directing a sorting operation, according to one or more implementations of the presently disclosed subject matter.
Figure 13:
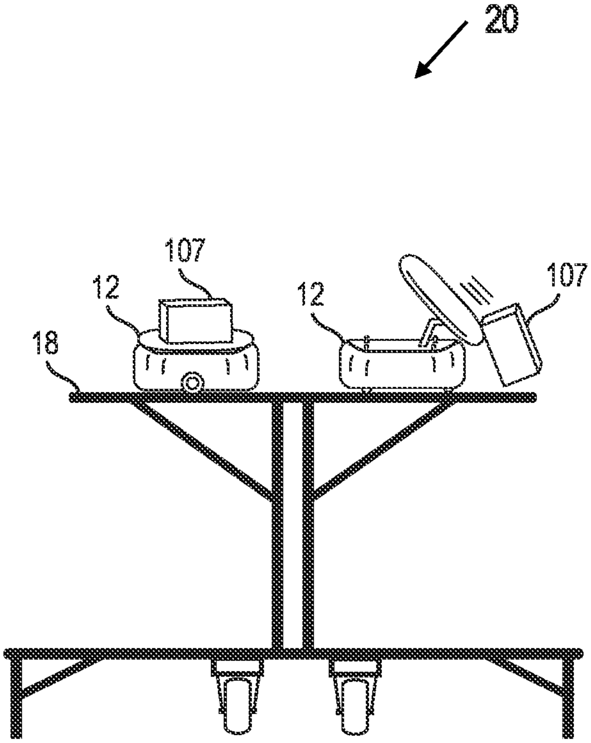
FIG. 13 depicts an example implementation of a platform assembly forming part of an improved sorting system for use in directing a sorting operation, according to one or more implementations of the presently disclosed subject matter.

FIG. 1 depicts an example implementation of chamber bank 70. FIGS. 2-4 depict one or more example implementations of chamber 72 forming part of chamber bank 70. FIGS. 5 and 6 depict example implementations of chamber bank 70 including a sensor such as sensor 516 having a range of vision 64. FIG. 7 depicts an example implementation of chamber bank 70 that includes sensor 516 having a range of vision 64 as well as a secondary sensor 518 having a secondary range of vision 65 wherein the secondary sensor 518 is positioned lower than sensor 516. FIG. 8 depicts an example implementation of system 501. FIG. 9 depicts an example implementation of a transport device 12 carrying thereon an article 107 for depositing into receptacle 13. FIG. 10 depicts an example implementation of chamber bank 70 that includes secondary sensor 518 having a secondary range of vision 65 wherein the secondary sensor 518 is positioned lower than sensor 516. FIGS. 11 and 12 depict exemplary flowcharts of exemplary implementations of an improved sorting system for directing a sorting operation. FIG. 13 depicts an example implementation of platform assembly 20 comprising a platform 18 with transport devices 12 carrying thereon articles 107 for depositing into a receptacle 13; the transport device 12 to the right is shown to be in the middle of the process of depositing article 107.

According to various embodiments of the presently disclosed subject matter, an exemplary system such as system 501 (see FIG. 8) for use in directing a sorting operation is provided. FIG. 8 accordingly depicts a block diagram of an improved article sorting system 501 (hereinafter "system 501") for use with directing a sorting operation, for e.g., when a destination receptacle is to be overfilled to thereby improve overall operational efficiencies, according to one or more implementations of the presently disclosed subject matter.

In various embodiments, system 501 comprises a control server such as server 502. Whereas the terms "system 501" and "server 502" may be used herein interchangeably, it is to be understood that server 502 is a sub-component of system 501. System 501 further comprises a receptacle assignment engine such as receptacle assignment engine 508, one or more receptacles 13, one or more article information acquisition devices 506, a destination information database 512, a wireless access point 514, and one or more automated transport devices such as transport devices 12. Various components of system 501 are depicted in a representative manner as blocks representing a generic descriptor of the technology. Server 502 comprises, among other components, a memory, a processor, with server 502 being in communication with or including receptacle assignment engine 508. Server 502 accordingly comprises a memory, a processor, and may further comprise receptacle assignment engine 508. Transport devices 12, for example in the form of AMRs, are configured for transporting and depositing articles comprising scripts and script packages into receptacles 13. Receptacle 13 includes assigned receptacles 13 and unassigned receptacles 13, filled up receptacles such as full receptacles 13, and replacement receptacles 13 that replace full receptacles 13.

System 501 further comprises a chamber bank such as chamber bank 70 (see FIG. 1) comprising a group or bank of chambers such as chambers 72 (see FIG. 1). Each chamber 72 is configured for receiving a receptacle such as receptacle 13 therein. According to at least one embodiment, chamber 72 is defined by a floor 74, a left wall 76, a right wall 78, and a rear wall 75 that together define a receiving space for totes or receptacles such as receptacle 13. According to at least one embodiment, floor 74 of chamber 72 slopes downward from the rear wall 75 towards the front region of chamber 72. The sloping of floor 74 can facilitate the removal of receptacle 13 either after it is full or after an order associated with the receptacle has been completed. In various embodiments, at least one of left wall 76, right wall 78, and rear wall 75 extends above a top rim 80 of receptacle 13 received within chamber 72. In at least one embodiment, receptacle 13 sits within chamber 72 such that each of left wall 76, right wall 78, and rear wall 75 extends one or more inches, for e.g., between 1 inch and 30 inches or more, above top rim 80 of receptacle 13; this provides for a spacing of between 1 inch and 30 inches or more between the bottom-most point or the bottom-most edge of ramp 82 of chamber bank 70 and top rim 80 of receptacle 13. Transport devices 12 provide for transporting and depositing articles 107 into receptacles 13. In one embodiment, a transport device 12 travels along platform 18 (see FIG. 13) of platform assembly 20 for transporting an article 107 transporting and depositing an article 107 into a receptacle 13.

According to various embodiments, a chamber bank for use in a sorting operation such as chamber bank 70 is provided. According to various embodiments, chamber bank 70 comprises one or more chambers 72. Each chamber 72 is configured for receiving a receptacle 13 therein. Chamber 72 is defined by a floor 74, a left wall 76, a right wall 78, and a rear wall 75 that together define a receiving space for a receptacle 13. In various embodiments, at least one of the left, right and rear walls is taller than the corresponding abutting side wall of the receptacle 13 received therein. According to various embodiments, chamber 72 of system 501 further comprises a ridge 92 provided in a front portion of chamber 72 for preventing receptacle 13 from sliding out of chamber 72. In at least one embodiment, ridge 92 extends across a portion of the space between the left and right walls of chamber 72.

According to at least one embodiment, system 501 is configured to assign a first number of articles 107 N that occupy a first volume V to a first receptacle 13 among a plurality of receptacles 13 such that the first number of articles N overfills the first receptacle 13 when all of the first number of articles N are deposited thereinto; in at least one embodiment, the "ungroomed" volume of the first number N of articles 107 exceeds the first volume VR of a first receptacle 13. System 501 is further configured to direct transport device 12 to transport and deposit the first number of articles 107 N into the first receptacle 13. According to various embodiments, the first volume V occupied by the first number N of articles shall be equal to between 0% and 400% of the volume VR of first receptacle 13 such that in at least one embodiment the first number of articles N overfills the first receptacle 13 prior to the first number of articles being "groomed" by the application of pressure to compress the first of articles such that they fit with the volume VR of first receptacle 13; after one or more such groomings, the first receptacle 13 can be closed and/or otherwise sealed so that it can be transported or shipped to its destination such as a store address or a customer address.

According to various embodiments, receptacle assignment engine 508 is configured to compare the volume V of the first number of articles N to a volume VR of the first receptacle 13. After one or more "groomings" of the articles by the application of pressure to compress the first of articles such that they fit within the volume VR of first receptacle 13, the first volume V occupied by the first number N of articles is reduced and otherwise compressed to have a reduced total compressed volume VC such that the total compressed volume VC of all of the first number N of articles, i.e., the total compressed volume VC of the first number N of articles, is less than or equal to volume of first receptacle 13 VR. After the required one or more groomings to reduce the volume of the first number of articles to a compressed volume VC, the first receptacle 13 is closed and/or otherwise sealed with all of the first number N of articles present therein. Accordingly, in at least one embodiment, the first number N of articles 107 are compressed such that the total compressed volume VC of all of first number N of articles is less than the total volume VR of first receptacle 13.

According to at least one embodiment, the first number of articles N are compressed manually by a manual operator such that all of the first number N of articles fit into first receptacle 13; in other words, a person gets to the location of the first receptacle 13 and manually compresses the overfilled articles into first receptacle 13 to result in the total compressed volume VC of all of first number N of articles. According to at least one alternate embodiment, the first number N of articles 107 are compressed by automated means to arrive at the total compressed volume VC of all of first number N of articles such that the first number of articles can fit into the first receptacle 13 after which first receptacle 13 can be closed and/or otherwise sealed with all of the first number N of articles present therein; in such an embodiment, a robotic arm or some other automated compressing mechanism compresses the overfilled articles into first receptacle 13 to arrive at the total compressed volume VC of all of first number N of articles after which first receptacle 13 can be closed and/or otherwise sealed with all of the first number N of articles present therein.

According to various embodiments, system 501 is further configured to transmit information indicating that the first receptacle 13 is ready to be compressed, at which point the first receptacle 13 can be compressed either manually or by automated means. According to various embodiments, system 501 is optionally further configured to transmit information indicating that the first receptacle 13 is ready to be compressed for a second time; in such an embodiment, there may be more than one instance of compression the articles deposited into the first receptacle 13. In some embodiments, the first receptacle 13 may be compressed on 2, 3, 4 or more occasions based on the needs of the application at hand. According to various embodiments, system 501 is further configured to transmit the information indicating that the first receptacle 13 is ready to be compressed in such a manner that it can be received at a hand-held computing device or smart device. According to various embodiments, system 501 or receptacle assignment engine 508 is further configured to calculate or estimate an uncompressed and a compressed volume of the first number of articles to be deposited into the first receptacle.

According to various embodiments, chamber bank 70 further comprises a ramp or transition such as ramp 82 (see FIG. 1) extending towards a top edge of the rear wall 75 of chamber 72. As noted earlier, receptacle 13 may sit within the walls of chamber 72 such that each of left wall 76, right wall 78, and rear wall 75 extends one or more inches, for e.g., anywhere between 1 inch and 30 inches or more, above top rim 80 of receptacle 13. This provides for a spacing of between 1 inch and 30 inches or more between the bottom-most point or the bottom-most edge of ramp 82 that extends towards a top edge of the rear wall 75 of the chamber 72. According to various embodiments, ramp 82 comprises an article sliding path 84 defined by two or more guides 86 projecting upwards from ramp 82 (see FIG. 1).

According to various embodiments, chamber 72 of system 501 further comprises a gate such as gate 88 extending across an opening at a front region of chamber 72. In one embodiment, gate 88 extends across a whole of the spacing separating left wall 76 and right wall 78. According to one or more embodiments, gate 88 extends across an opening at a front region of chamber 72. In various embodiments, an upper edge of gate 88 extends several inches (e.g., between 1 inch and 30 inches or more) above top rim 80 of receptacle 13; this feature can advantageously support articles overfilled into receptacle 13 and can otherwise advantageously prevent such overfilled articles from falling off of receptacle 13 or off of chamber 72. Accordingly, whereas such overfilled articles would have slid and fallen off of receptacle 13 or off of chamber 72 in the absence of gate 88, gate 88 extending several inches above top rim 80 of receptacle 13 advantageously increases the holding capacity of receptacle 13 or of chamber 72 containing receptacle 13. As noted earlier, floor 74 of chamber 72 slopes downward from the rear wall 75 towards the front region of chamber 72, and this sloping profile of floor 74 facilitates the easy removal of an order complete receptacle or a full receptacle.

Chamber 72 further comprises latch 90 for detachably securing gate 88. In one embodiment, latch 90 takes the form of a magnetic latch that secures gate 88 with the gate comprising a ferrous material at least in an area that mates with latch 90. In various embodiments, chamber bank 70 accordingly further comprises a lock or latch such that latch 90 for securing gate 88. In some embodiments, latch 90 is configured for quick release or easy release such a minimal force above a low threshold value is sufficient to release the lock or latch. In one embodiment, latch 90 is a magnetic lock or a similar other locking mechanism.

FIG. 11 depicts an exemplary flowchart of an exemplary implementation of an improved sorting system for directing a sorting operation, according to one or more implementations of the presently disclosed subject matter. FIG. 11 accordingly depicts a flowchart of an exemplary process corresponding to system 501 that may be implemented, for example, by server 502. FIG. 11 illustrates a method implemented by system 501, according to one or more embodiments of the presently disclosed subject matter. At step 602, a system such as system 501 assigns a first number of articles to a first receptacle such as first receptacle 13. At step 604, system 501 directs a transport device such as transport device 12 to deposit the first number of articles at the first receptacle 13. At step 606, the system determines that the first receptacle 13 is overfilled. At step 608, system 501 transmits information indicating that the first receptacle 13 is ready to be compressed. At step 612, system 501 initiates the replacement of first receptacle 13. At step 614, system 501 determines that the replacement of first receptacle 13 has been accomplished.

FIG. 12 depicts another exemplary flowchart of an exemplary implementation of an improved sorting system for directing a sorting operation, according to one or more implementations of the presently disclosed subject matter. The exemplary process shown in FIG. 12 may be implemented, for example, by server 502. FIG. 12 illustrates a method implemented by system 501, according to one or more embodiments of the presently disclosed subject matter. At step 702, system 501 assigns a first number of articles to a first receptacle 13. At step 704, the system directs a transport device 12 to deposit less than the first number of articles at first receptacle 13. At step 706, system 501 determines that the first receptacle 13 is overfilled. At step 708, the system transmits information indicating that the first receptacle 13 is ready to be compressed; the articles deposited into first receptacle 13 are then compressed by manual or automated means. At step 710, system 501 redirects transport device 12 to deposit the remaining of the first number of articles at first receptacle 13. At step 712, the system initiates the replacement of the first receptacle 13. At step 714, the system determines that the replacement of first receptacle 13 has been accomplished.

According to various embodiments, system 501 further comprises a sensor such as sensor 516 (see FIG. 5) for detecting a fill level or an overfill level of first receptacle 13 or of chamber 72. In various embodiments, sensor 516 may take the form of a photo-eye sensor. In at least one embodiment, sensor 516 comprises one or more of: an infra-red sensor, an ultrasonic sensor, a visible light sensor, and a LIDAR (Light Detection and Ranging) sensor. In various embodiments, server 502 is in wired or wireless communication with one or more of: sensor 516 and secondary sensor 518. Each of sensor 516 and secondary sensor 518 is configured to sense the filling level or an overfilling level of a receptacle 13, for e.g., to sense whether a receptacle is empty, filled, or overfilled. In at least one embodiment, after system 501 identifies that a specific receptacle 13 has been filled or has been overfilled as determined by one or more of sensor 516 and secondary sensor 518, and system 501 determines that no more grooming of articles within the specific receptacle 13 is required or needed, server 502 directs a person, a robot, or an automated device to transport full receptacle 13 from its article receiving position that is proximal platform 18 or proximal platform assembly 20 to a location of further processing. In some embodiments, the full receptacle 13 is removed manually.

Accordingly, in various embodiments, server 502 is in communication with sensor 516 configured to sense if and when a receptacle 13 has been overfilled. FIGS. 5-7 illustrate some embodiments of sensor 516 that senses the filling level of receptacle 13 by employing a light plane or a light curtain set-up. In some embodiments, sensor 516 includes an emitter and a receiver, as is well understood by a person of skill in the art. Sensor 516 operates to sense that a receptacle is overfilled, filled, or is about to become full. In various embodiments, sensor 516 is in two-way communication with server 502 or with system 501. In one embodiment, sensor 516 takes the form of an optical sensor such as, for e.g., a photo-eye sensor. In one embodiment, sensor 516 in the form of an optical sensor shown in FIG. 5 that includes a field of vision 64 that sensor 516 utilizes to determine that a destination receptacle such as receptacle 13 has become full, has been overfilled or is in need of grooming, according to one or more implementations of the presently disclosed subject matter. In one embodiment, when the field of vision 64 indicates that the receptacle 13 is 75%, 80%, 85%, 90%, 95% or 99% full, or is over 100% full (i.e., has overfilled), server 502 in communication with sensor 516 receives such information about receptacle 13 from sensor 516 and optionally also from secondary sensor 518. In various embodiments, secondary sensor 518 shares the same or similar qualities as sensor 516.

In at least one embodiment, server 502 identifies or recognizes or receives information indicating that all receptacles 13 present in a given chamber bank 70 are full; on the recognition of or on the confirmation that all receptacles 13 present in a given chamber bank 70 are full, server 502 is further configured to direct replacement of all full receptacles 13 present within the "full" chamber bank 70 with replacement receptacles 13. In one embodiment, chamber bank 70 includes casters 94 (see FIG. 1) that render chamber bank 70 mobile whereby the "full" mobile chamber bank 70 is rolled away from its position proximal to the platform 18 and replaced with an "empty" chamber bank 70 that contains one or more empty receptacles 13. Server 502 is further configured to direct a transport device 12 to transport and deposit articles 107 into the empty receptacles 13 of the replaced "empty" chamber bank 70.

In at least one embodiment, when server 502 determines that one or more receptacle 13 are full or have been overfilled thereby resulting in a full receptacle 13, server 502 is further configured to direct replacement of the full or overfilled receptacle 13 (i.e., receptacle 13 that is full or overfilled) with a replacement receptacle 13 with or without grooming of the full or overfilled receptacle 13. In at least one embodiment, after a replacement receptacle 13 is properly positioned in an article receiving position within chamber 72 such that it is ready to receive articles, server 502 is configured to receive confirmation of this. Server 502 is thus configured to receive confirmation of the replacement of the first receptacle with an empty receptacle.

In various embodiments, system 501 further comprises an article information acquisition device 506 electronically coupled to server 502. Article information acquisition device 506 is configured to determine a product type of each article by interacting with each article. In various embodiments, server 502 is further configured to calculate or receive and store information such as one or more of: first volume V of a first number N of articles deposited into first receptacle 13, volume VR of first receptacle 13, and a total compressed volume VC of the first number of articles. In various embodiments, server 502 is further configured to calculate one or more of: a total number, a total count, and a total volume of articles delivered to or deposited at the first receptacle 13 by transport device 12. Server 502 can have access to information regarding the total volume of the first receptacle 13 whereby server 502 can determine, calculate, or estimate the time instant when the first receptacle is full or is about to get full.

In various embodiments, transport devices 12 may traverse a surface, floor area, or a platform such as platform 18 to deposit articles into receptacles. In at least one embodiment, system 501 is configured to assign a second number of articles to a second receptacle 13. In at least one embodiment, system 501 is configured to re-assign some of the articles previously assigned to the first receptacle 13 to a second receptacle 13. In various embodiments, system 501 can further operate to coordinate the replacement of a full receptacle 13 with a replacement receptacle 13.

System 501 comprises, or is in communication with, a destination information database 512 with server 502 of system 501. System 501 is configured to use data available at destination information database 512. In some embodiments, based on the data available at destination information database 512, server 502 is further configured to optimize the total distance that needs to be traveled by one or more transport devices to fill a particular receptacle such that the total distance traveled by all transport devices 12 to fill that receptacle is minimized whenever possible. For example, in one implementation, a destination that is expected to receive the greatest number of articles therein is assigned to one or more receptacles that are located closest to an article induction point; this advantageously ensures that the multiple trips needed to fill a particular high demand destination involve the shortest travel durations or the shortest (one-way or two-way) travel distances. Accordingly, in at least one embodiment, server 502 is configured to determine that the first receptacle is located beyond a predetermined distance from an article induction point, and based on this determination, server 502 is further configured to re-assign the first destination to a second receptacle, wherein the second receptacle is located within the predetermined (shorter) distance from an article induction point; in other words, second receptacle is located at shorter distance from the article induction point as compared to the first receptacle. For example, server 502 re-assigns a first destination ID from the first receptacle to the second receptacle that is close to, or is closest to, an article induction point; accordingly, in some embodiments, the second receptacle is located within a predetermined distance from the article induction point. Server 502 is further configured to redirect a transport device 12 to transport and deposit the first article 107 into the second receptacle, for e.g., wherein the first article 107 is associated with the first receptacle or a first destination.

In various embodiments, transport device 12 can comprise an automated mobile robot (AMR), a computer-controlled vehicle, a track-arranged device, an overhead transport device, a pedestal robot, a personal AMR, a pick assist AMR, an automated conveyor system, or any similar automated transport or transfer device. In at least one embodiment, transport device 12 traverses a first surface, floor area, platform, or a track arrangement. In some embodiments, transport device 12 may comprise a conveyor. FIG. 9 depicts an example automated transport device such as transport device 12 for carrying, moving, or transporting an article such as first article 107 to be sorted to a receptacle.

In one implementation, system 501 carries out sortation operations using transport devices in the form of autonomous mobile robots (AMRs). In this implementation, a given AMR has been routed to a receptacle and the system recognizes that the receptacle is full or that the receptacle has been overfilled. AMRs which are enroute to a destination receptacle which is determined to be filled up or to have been overfilled after an AMR has been dispatched by the system to deliver an article to closes, the AMR is re-routed to the new receptacle. The event of a destination receptacle being filled up or being overfilled can be determined by sensor 516 at the location that communicates this information to server 502, or by server 502 that calculates the total cubic volume or total weight of all of the articles sorted into that destination receptacle. Server 502 re-routes any enroute vehicles from the filled or overfilled receptacle location to a new receptacle's physical location. Any subsequent articles destined for the filled or overfilled receptacle destination are routed to the new receptacle's physical location. Server 502 initiates or directs the change-out or grooming of the filled or overfilled receptacle or the changeout of the chamber bank containing the filled or overfilled receptacle. This initiation may be in the form of a message to another system that controls the change-out robots, or in the form of an indication to a human operator via lights, sounds, signals sent to a handheld computer, etc. When the change-out or grooming is complete, the change-out or grooming automation mechanism or human operator may send a confirmatory message to the server indicating that the location is available for another or the same assignment.

System 501 may further include an input article region that functions to hold articles prior to sorting. In one variation, the input article region includes one or more input article holders that contain unsorted articles. The article holders can be placed adjacent to article information acquisition device 506 and are preferably within the reachable range of article information acquisition device 506. In this way, a worker, conveyor system, or a robotic system may move an article holder into position and optionally remove empty (or otherwise finished) article holders present at input article region. Articles and/or article holders may be moved through or added to the input article region using a conveyor, a chute, an autonomous mobile robot, or using any suitable mechanism. In one embodiment, one or more articles may be supplied such that an article identifier (or property) is already known to system 501 when article information acquisition device 506 interacts with the article whereby a receptacle 13 may be associated with the article prior to placement of the article on a transport device 12. In one embodiment, the order of article selection by system 501 may factor in the capacity levels of receptacles such that an article is dispatched after server 502 determines that an associated receptacle 13 has capacity to receive the article.

Article information acquisition device 506 may include one or more sensors configured for article identification.

This could include a sensor for scanning a barcode and/or an RFID tag reader. In one exemplary implementation, system 501 may include 4 barcode scanners: two side scanners, one top scanner, and a bottom scanner. The two side barcode scanners can capture barcodes on the sides of articles while rotating the article. The top scanner can capture barcodes from up top such as after article placement in a transfer tray or the article tray. The bottom scanner can capture barcodes from below as the article is removed from the article receptacle. A transparent shield can be placed above the bottom scanner so that if an article is dropped it will deflect off the shield. Any suitable sensing system may be used for collecting information of an article that can be used to determine a destination output receptacle.

Article information acquisition device 506 may further function to collect data of the objects and the environment. In one embodiment, article information acquisition device 506 includes an imaging system, which functions to collect image data. The imaging system can include at least one imaging device with a field of view of a region of interest that covers a region where the article is transferred to a transport device 12 and the input article region. The imaging system may additionally include multiple imaging devices used to collect image data from multiple perspectives of a distinct region, overlapping regions, and/or distinct non-overlapping regions. The set of imaging devices (e.g., one imaging device or a plurality of imaging devices) may include a visual imaging device (e.g., a camera). The set of imaging devices may additionally or alternatively include other types of imaging devices such as a depth camera. Other suitable types of imaging devices may additionally or alternatively be used. Article information acquisition device 506 may collect data that is communicated to the server 502 to facilitate article placement onto a transport device. For example, image data of a collection of articles in the input article region can be processed by an analysis model that outputs one or more sortation plans (e.g., points for article selection, or motion plans for approaching, and picking up an article).

Article information acquisition device 506 may additionally or alternatively include one or more sensors for article dimensioning. Article information acquisition device 506 could include one or more dimensional camera (e.g., a depth sensor) or similar other sensor system for dimensioning the article. Dimensioning can include determining spatial characteristics of the article (i.e., article dimensions). In one implementation the article dimensions can include defining a bounding volume of the article (e.g., a width, height, and depth of the article). The article dimensions may be used at least in part in planning placement orientation during induction and sortation into a receptacle 13. Other sensors such as load cells, proximity sensors, RFID tracking systems, and the like may also be used to monitor status of various aspects of system 501. System 501 may additionally include other supplementary systems such as, for e.g., label printer and applicator, which function to enable labels to be produced and applied to an article prior to sortation.

System 501 may additionally include a receptacle capacity sensor that functions to measure the capacity level of an article receptacle and/or to detect when an article receptacle is at proximity. In one embodiment, one or more of sensor 516 and secondary sensor 518 may perform this function. A variety of sensing technologies may be used for these purposes. In one implementation, a depth sensor or an imaging system can be downwardly attached to a surface such as platform 18 or ramp 82. The depth sensor can detect or collect image data used in predicting the capacity level of an article receptacle as it passes over the article receptacles. The capacity of an article receptacle may be measured each time an article is deposited into it. The receptacle capacity sensor is in one- or two-way communication with server 502. In one variation, the output receptacle capacity sensor is coupled to platform 18 or to transport device 12 such that the output receptacle capacity sensor can be moved across an array of receptacles 13. The capacity of a receptacle 13 may be measured as the capacity sensor passes over a receptacle during use of the transport device 12 such as when in transit and/or while depositing an article. Further, platform 18 or ramp 82 may be equipped with sensors or other elements that can act on an article being sorted. In particular, platform 18 could include a weight sensor so that articles could be weighed prior to being transferred to a transport device. In one example, the weight sensor could be a load cell (or other sort of pressure sensor, strain sensor, digital scale, or the like to estimate/measure weight) integrated into a transfer tray.

In one implementation, article information acquisition device 506 interacting with the article can include determining an identifier of the article. This may be used when information concerning the identity of the article is unknown prior to picking the article. Accordingly, the article may be scanned or imaged to determine a designated grouping. For example, for parcels, an address may be scanned and used for determining which route group to use for the parcel. Determining an identifier of the article may include scanning a barcode (or other suitable type of machine-readable code or information), reading an RFID tag, or reading another type of wireless identifier signal, visually classifying the article using computer vision analysis, and/or using some other identification or classification technique.

After determining the identifier of the article, the system may determine a targeted article receptacle of the article based on the identifier of the article. In other words, an article can be picked and scanned to determine its identity, and then based on the identity query a database to determine which one or more targeted article receptacle to associate with the article. The system can then facilitate sorting the article into the targeted article receptacle such as receptacle 13.

According to at least one embodiment, server 502 operates to manage the sort destinations using at least 3 main parameters or fields: receptacles, physical locations, and logical destinations. In various embodiments, the destination associated with a receptacle 13 may represent: an order, a store, a shipping route, carrier, zip code, city, and a similar other characteristic. In at least one embodiment, there are multiple receptacles associated with one destination ID, e.g., when a store order requires more than will fit in one receptacle. Accordingly, in at least one embodiment, server 502 uses physical locations (rather than receptacles) to sort articles and to direct transport device 12 for sorting articles into receptacles.

In one embodiment, processing of the article to be sorted before placement on a transport device can include determining dimensional properties of the article, which functions to sense or detect one or more dimensions of the article. In one embodiment, determining dimensional properties of the article can include determining a bounding volume of the article (e.g., height, width, and depth). In another embodiment, determining dimensional properties of the article may include collecting a full or partial 3D scan of the surface of the article. Determining dimensional properties can include sensing one or more dimensional metrics of the article. This may involve moving the article in range of a dimensional camera or other sensing system. This may additionally include manipulating the article within the view of a sensor for scanning different views of the article. In addition to sensing dimensions, image data may be used to predict dimensions and/or form of the object using an AI (artificial intelligence) classifier model or other technique.

The dimensional properties may be used for any suitable purpose, but in one particular embodiment, the dimensional properties may be used in predicting a placement orientation of the article for depositing into an article receptacle. In other words, the dimensions and/or shape of the article can be used for figuring out how the article may be best placed in an article tray of an article sortation unit so that when it deposits the article into an article receptacle it has high confidence for successful depositing. This can avoid situations where articles of more irregular forms could flip over and miss an article receptacle. In one embodiment, the dimensional properties of the article can be used in determining if an article is larger in one or more axes than the container opening and then orienting the article such that when deposited the object enters an article receptacle with a side with dimensions that do fit within a defined opening of the article receptacle.

Herein, reference made to "articles" characterizes the objects subjected to sortation by a sorting system. An article can be any suitable type of object such as a package, a parcel, a product, raw material good (e.g., a manufactured part), and/or any suitable type of object that needs sortation organization. In the case of shipping or other operational contexts, an article may have various properties. In a parcel processing center, articles could be, for example: boxed goods, bagged goods, and/or parcels. An article could have destination information indicating where it should be shipped. An article could have an article type information that could correspond to a stock keeping unit (SKU) identifier or an alternative product identifier.

Herein, reference is also made to receptacles such as receptacle 13, which is used to characterize the receptacle used to hold articles once sorted. The form factor and variety of the receptacles can vary greatly, and the system may be adapted to different types of receptacles such as boxes, receptacles, trays, bags, gaylords, and the like. Article receptacles may use any suitable form factor and, in some cases, may use the same type of container. In some variations, the form factor may be customized for particular variations and implementations of system 501 as described herein.

In some implementations, one or more components such as receptacle assignment engine 508 and destination information database 512 may reside external to server 502 but nonetheless in communication with server 502. System 501 further comprises or is in communication with sensors 516, transport devices 12, and one or more receptacles 13. System 501 includes additional components such as article information acquisition device 506 (e.g., a scanner, image capturing equipment, or similar other equipment), and a wireless access point 514, among others. System 501 further includes one or more receptacles 13, wherein system 501 operates to sort a plurality of articles to a receptacle 13, the plurality of articles comprising a first article 107.

In various embodiments, server 502 is a control server that is configured for communicating with one or more components of system 501 as described herein, and as shown, for example, in FIG. 8. In one implementation, server 502 includes memory, a processor, and/or one or more communication interfaces communicatively coupled to each other. A network may form part of system 501, wherein the network may take on any appropriate form, including a wireless network such as Wi-Fi, cellular, or other frequency bands for private use, or a hard-wired network such as LAN, WAN, internet, etc., and combinations thereof. In one implementation, server 502 may communicate over the network with the cloud. In some implementations, one or more components of server 502 may reside in the cloud. Similarly, several of the components such as, for example, article information acquisition device 506, wireless access point 514, computer-controlled or automated transport devices 12 and server 502 may communicate over the network with the cloud. In some implementations, one or more components of system 501 may reside in the cloud. For example, in one implementation, server 502 may reside in the cloud. In at least one implementation, server 502 may be in communication with one or more third-party servers, such as warehouse management system servers and automated transport device operations control servers.

As used herein, the term "cloud" refers to several servers connected to the internet that can be leased as part of a software or application service. Cloud-based services can include web hosting, data hosting and sharing, and software or application use. The term "cloud" also refers to cloud computing, where several servers are linked together to share the load. This means that instead of using one single powerful machine, complex processes can be distributed across multiple smaller computers. In various implementations, server 502 can be or can otherwise include a server as the term "server" is understood in its broadest sense. The term "server" as used herein includes any computer that provides data to other computers. It may serve data to systems on a local area network (LAN) or a wide area network (WAN) over the Internet. In various implementations, server 502 can be or can include a cloud server. The term "cloud server" as used herein includes any pooled, centralized server resource that is hosted and delivered over a network—typically the Internet—and accessed on demand by multiple users. A cloud server can be remotely located (e.g., reside in a remote cloud server configuration). A cloud server can be a virtual server (rather than a physical server) running in a cloud computing environment. A cloud server can be built, hosted, and delivered via a cloud computing platform via the internet, and can be accessed remotely. A cloud server can include all the software it requires to run and can function as an independent unit. A cloud server can perform all the same functions as a traditional physical server including delivering processing power, storage, and applications. One of the advantages of cloud storage is that there are many distributed resources acting as one-often called federated storage clouds. This makes the cloud very tolerant of faults, due to the distribution of data. Use of the cloud can reduce the creation of different versions of files, due to shared access to documents, files, and data.

Each of the components of system 501 may be in communication with one or more other components through a wired and/or a wireless network. For example, the cloud, the server 502 may further communicate with receptacles 13, chamber banks 70, chambers 72, receptacles 13, receptacle assignment engine 508, sensors 516, article information acquisition devices 506, automated transport devices 12, destination information database 512, and wireless access point 514 over a network.

A person of ordinary skill in the art would understand that the implementations described in this application are examples, and that the scope of this application is not limited by these examples or implementations. For instance, while the preferred implementation relates to sorting robots, the apparatus and method described herein would apply equally well to any automated transport device set up meant for transporting or transferring articles of disparate sizes. For instance, the disclosed apparatus and method would also be applicable for pick assist robot applications. Similarly, the disclosure here is also relevant to lifting robots and several other types of robots used in warehouse and material handling facility applications.

In one exemplary application, system 501 can be used for consolidating parcels for shipping. For example, a parcel processing site may use system 501 to sort parcels by destinations (e.g., zip codes or delivery routes) for subsequent shipment processing. Unsorted letters and/or packages can be collected into large article receptacles and then system 501 can facilitate sorting those into smaller article receptacles for different delivery routes/destinations. There is a high need for compact and modular sortation of articles beyond parcels though and system 501 can similarly be applied to those applications.

In another exemplary application, system 501 can be used for returned good processing and/or good restocking. For example, mixed article receptacles of returned goods could be appropriately sorted for reshelving, restocking, or other subsequent processing. In another example, newly received article orders could be sorted into appropriate receptacles for replenishing article stock within a store. The size and automated affordances of system 501 is such that it could be used in a variety of environments such as in a back-warehouse of a retail store or in an order fulfillment center (e.g., such as for ecommerce returns).

In another exemplary application, system 501 may be used for order fulfillment where a collection of articles is sorted into individual article receptacles, where each article receptacle may be associated with a particular order. In some embodiments, the orders may be, for e.g., for consumers such as ecommerce orders; in at least one example, the orders represent commercial orders for delivery to a business. In a similar manner, system 501 may also be used for dynamic or custom kitting for industrial or consumer goods.

In a fully autonomous implementation of the system, the article receptacles may be attached to an automated conveyor system or other translation devices such that the article receptacles can be removed in an automated fashion. Similarly, empty (or at least not full) article receptacles may be moved into an unfilled region of the article receptacle array. In one implementation an autonomous robot, pallet jack or tug may engage with article receptacles when at capacity and remove them from the article receptacle array. Similarly, new article receptacles can be automatically inserted into a non-filled article receptacle space.

In a semi-automated system, signaling changing of an article receptacle may include triggering an alert and indicating the article receptacle(s) to be removed. The alert may similarly indicate the assigned grouping and the next task for the article receptacle. This may alert human workers that can manually or through the aid of some mechanism remove an article receptacle and/or load an article receptacle.

Article receptacles may be generally signaled for discharging (using an autonomous or semi-autonomous approach) when the article receptacle satisfies a capacity condition. The capacity condition may be based on how full or overfilled the article receptacle is or whether an order has been completed. However, the method can additionally model expected time and availability to exchange an article receptacle. For example, an article receptacle may be removed before it is at a capacity limit to avoid having too many article receptacles needing exchange at the same time. As another condition, an article receptacle may be discharged when the method determines a benefit to having a different mix of groupings allocated within the receptacle array. For example, an uncommon article receptacle may be discharged when it has few articles such that a new article receptacle placed in that position can be reassigned to a different grouping.

System 501 may provide a number of potential benefits as noted herein. System 501 is not limited to always providing such benefits and is presented only as exemplary representations of how system 501 may be put to use. The list of benefits is not intended to be exhaustive and other benefits may additionally or alternatively exist.

A person of ordinary skill in the art would understand that the embodiments described in this application are examples, and that the scope of this application is not limited by these examples or embodiments. For instance, while the preferred embodiment relates to order sorting in a warehouse or industrial facility, the apparatus and method described herein would apply equally well to any material handling environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment comprising software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM [erasable programmable read-only memory] or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A system for use in directing a sorting operation, the system comprising:

a server comprising a memory, a processor, and a receptacle assignment engine;

a chamber bank for use in a sorting operation comprising at least one chamber configured for receiving a receptacle therein, the chamber defined by a floor, a left wall, a right wall, and a rear wall that together define a receiving space for a receptacle, wherein at least one of the left wall and the right wall extends above a top rim of the receptacle received therein, wherein front facing free ends of the left wall, the right wall, and the floor define a front opening of the chamber for receiving the receptacle therethrough, the front facing free ends positioned opposite to bounded ends in contact with the rear wall, wherein top ends of the left wall, the right wall, and the rear wall define a top opening of the chamber for receiving articles to be sorted therethrough as the articles are deposited into the receptacle, wherein the floor of the chamber is defined by a base surface of the chamber bank; and an automated transport device for transporting and depositing the articles to be sorted into receptacles;

wherein the system is configured to:

assign a first number of articles occupying a first volume to be sorted into a first receptacle such that the first number of articles stack up to extend above the top rim of the first receptacle to thereby overfill the first receptacle when all of the first number of articles are deposited thereinto; and direct an automated transport device to transport and deposit the first number of articles into the first receptacle through the top opening of the chamber.

2. The system of claim 1, wherein the first number of articles are compressed such that a total volume of the first number of articles is less than a total volume of the first receptacle.

3. The system of claim 2, wherein the first number of articles are compressed manually such that the first number of articles fit into the first receptacle.

4. The system of claim 2, wherein the first number of articles are compressed by automated means such that the first number of articles fit into the first receptacle.

5. The system of claim 2, wherein the system further transmits information indicating that the first receptacle is ready to be compressed.

6. The system of claim 5, wherein the system further transmits information indicating that the first receptacle is ready to be compressed for a second time.

7. The system of claim 5, wherein the information is received at a hand-held computing device.

8. The system of claim 1, wherein the receptacle assignment engine calculates a volume of the first number of articles to be deposited into the first receptacle.

9. The system of claim 8, wherein the receptacle assignment engine compares the volume of the first number of articles to a volume of the first receptacle.

10. The system of claim 1, wherein the chamber bank further comprises a ramp extending towards a top edge of the rear wall of the chamber.

11. The system of claim 10, wherein the ramp comprises an article sliding path defined by two guides projecting upwards from the ramp.

12. The system of claim 1, wherein the floor of the chamber slopes downward from the rear wall towards a front region of the chamber.

13. The system of claim 1, further comprising a gate extending across an opening at a front region of the chamber.

14. The system of claim 13, further comprising a magnetic latch for securing the gate.

15. The system of claim 1, further comprising a sensor for detecting a fill level of the first receptacle.

16. The system of claim 15, wherein the sensor comprises one or more of: an infra-red sensor, an ultrasonic sensor, a visible light sensor, and a LIDAR (Light Detection and Ranging) sensor.

17. The system of claim 1, further comprising a ridge provided in a front portion of the chamber for preventing the receptacle from sliding out of the chamber, the ridge extending across a portion of the space between the left and right walls of the chamber.

18. A chamber bank system for use in a sorting operation, the chamber bank system comprising:

a chamber bank for use in a sorting operation, the chamber bank comprising at least one chamber configured for receiving a first receptacle therein;

the chamber defined by a floor, a left wall, a right wall, and a rear wall that together define a receiving space for a receptacle;

wherein at least one of the left wall and the right wall is taller than the corresponding abutting side wall of the receptacle received therein, wherein front facing free ends of the left wall, the right wall, and the floor define a front opening of the chamber for receiving the receptacle therethrough, the front facing free ends positioned opposite to bounded ends in contact with the rear wall, wherein top ends of the left wall, the right wall, and the rear wall define a top opening of the chamber for receiving articles to be sorted therethrough as the articles are deposited into the receptacle, wherein the floor of the chamber is defined by a base surface of the chamber bank, wherein an automated transport device transports and deposits a first number of the articles to be sorted into the first receptacle through the top opening of the chamber such that the first number of articles stack up to extend above a top rim of the first receptacle to thereby overfill the first receptacle when all of the first number of articles are deposited thereinto.

19. The chamber bank system of claim 18, further comprising a gate extending across an opening at a front region of the chamber.

20. The chamber bank system of claim 19, further comprising a ramp extending towards a top edge of the rear wall of the chamber, wherein the ramp comprises an article sliding path defined by two guides projecting upwards from the ramp.

* * * * *